Figure 3:
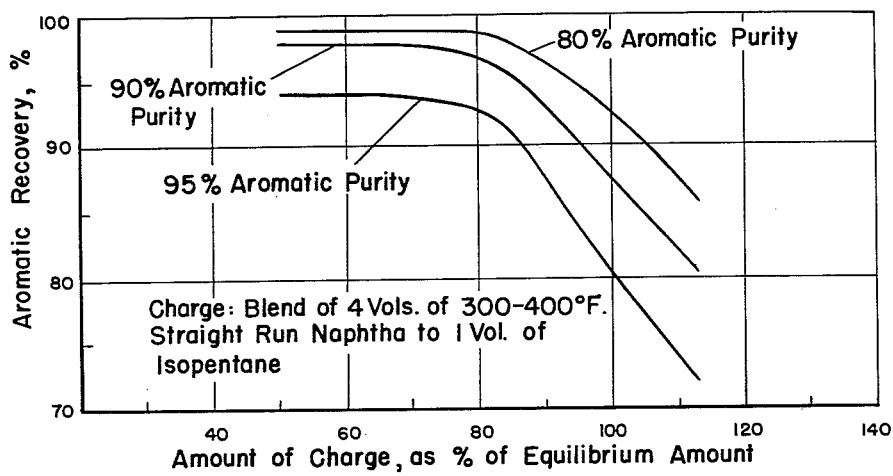

Aug. 23, 1955  J. L. OLSEN  2,716,144
SEPARATION OF AROMATICS FROM GASOLINE OR KEROSENE FRACTIONS
Filed Sept. 5, 1951  5 Sheets-Sheet 1
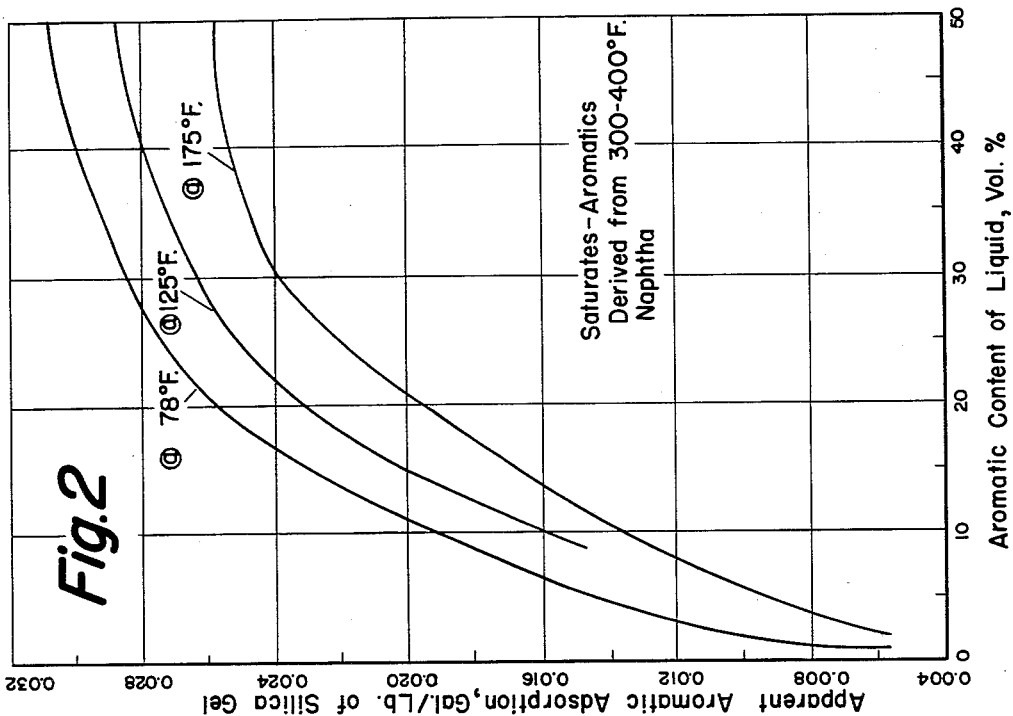
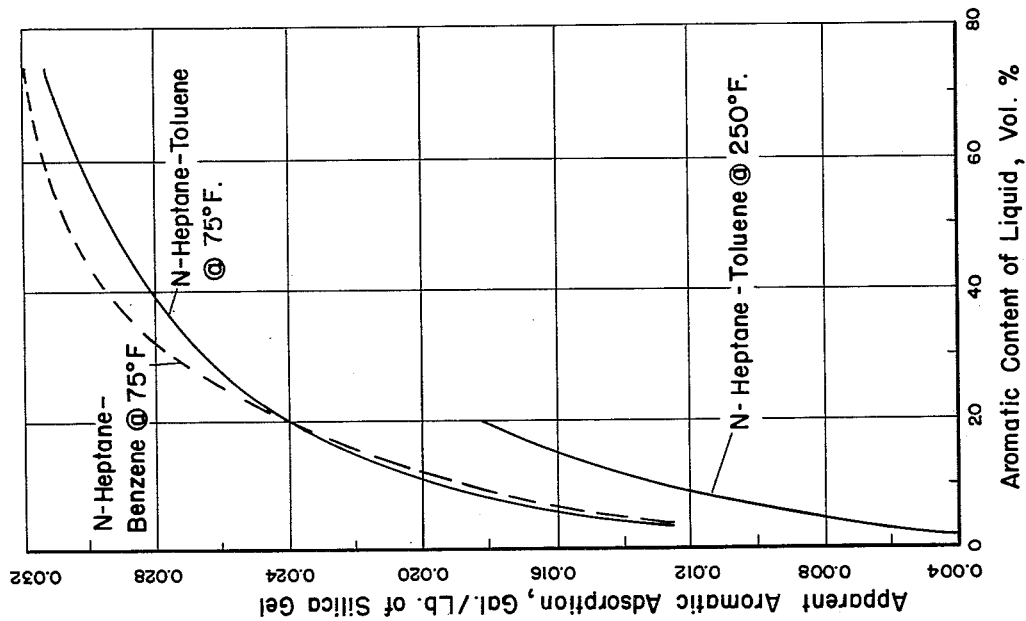
INVENTOR.
JOHN L. OLSEN
BY
*Busser and Harding*
ATTORNEYS Aug. 23, 1955          J. L. OLSEN          2,716,144

SEPARATION OF AROMATICS FROM GASOLINE OR KEROSENE FRACTIONS

Filed Sept. 5, 1951          5 Sheets-Sheet 4

INVENTOR.
JOHN L. OLSEN

BY
*Busser and Harding*

ATTORNEYS

Aug. 23, 1955        J. L. OLSEN        2,716,144
SEPARATION OF AROMATICS FROM GASOLINE OR KEROSENE FRACTIONS
Filed Sept. 5, 1951        5 Sheets—Sheet 5

INVENTOR.
JOHN L. OLSEN
BY *Busser and Harding*
ATTORNEYS

United States Patent Office 2,716,144
Patented Aug. 23, 1955

2,716,144

SEPARATION OF AROMATICS FROM GASOLINE OR KEROSENE FRACTIONS

John L. Olsen, Claymont, Del., assignor to Sun Oil Company, Philadelphia, Pa., a corporation of New Jersey Application September 5, 1951, Serial No. 245,200

10 Claims. (Cl. 260—674)

This invention relates to the separation of aromatics from hydrocarbon fractions boiling within the range of gasoline and kerosene. The invention is particularly directed to a cyclic process for separating aromatics from such fractions, which involves selectively adsorbing aromatics from the charge by means of silica gel and removing the aromatics thus adsorbed by means of a liquid aromatic hydrocarbon desorbing agent.

It is well known that silica gel possesses the ability to selectively adsorb aromatics from a mixture composed of aromatic and non-aromatic hydrocarbons. In the prior art, several methods have been proposed for removing the adsorbed aromatics from the selica gel, including the use of means such as water, polar organic liquids, hot air and steam. A disadvantage inherent in such methods is that heating and cooling of the adsorbent is required during each cycle of operation, which is obviously undesirable for large scale commercial operations due to the time and expense involved.

More recently, a cyclic process has been described and claimed in Lipkin Reissue Patent No. 23,005 for removing aromatics from hydrocarbon fractions such as gasoline or kerosene by means of silica gel. In that process, the aforesaid disadvantages of former methods have been obviated by desorbing the aromatics and simultaneously reactivating the silica gel for re-use by means of a hydrocarbon liquid of lower adsorbability than the aromatics, as, for example, by employing a saturate hydrocarbon such as a paraffin or naphthene. This has permitted operating in a cyclic manner without any necessity for heating and cooling the adsorbent throughout the cycle.

The present invention provides an improved cyclic process which is especially effective for making a sharp separation between aromatic and non-aromatic constituents of a hydrocarbon charge boiling within the range of gasoline and kerosene. The efficiency of the process depends upon maintaining certain operating conditions during both the adsorption and desorption phases of the cycle as hereinafter fully specified, in combination with the use of a desorbing agent which is an essentially aromatic hydrocarbon liquid that boils outside of the boiling range of the charge.

According to the invention, the gasoline or kerosene fraction to be treated is introduced in liquid form in a certain hereinafter specified amount during each cycle into a bed of silica gel to selectively adsorb the aromatic constituent. An essentially aromatic desorbent liquid which boils below 500° F. and outside of the boiling range of the gasoline or kerosene fraction is subsequently introduced during each cycle into the silica gel in a certain hereinafter specified amount to displace charge hydrocarbons therefrom. Directly following the aromatic desorbent, a further quantity of the charge fraction is fed into the silica gel to begin a new cycle of operation. During a portion of each cycle the effluent from the silica gel bed comprises the non-aromatic charge hydrocarbons in admixture with aromatic desorbent, while during the remainder of the cycle it comprises the aromatic charge hydrocarbons in admixture with aromatic desorbent. These portions are segregated from each other and may be separately distilled to recover the desorbent from the aromatic and non-aromatic products.

The use of the specified aromatic desorbent, in conjunction with certain amounts of charge and desorbent during each cycle of operation, gives unexpectedly improved results in separating the aromatic and non-aromatic portions of a gasoline or kerosene charge fraction by means of silica gel. While upon first appearance it would seem that silica gel which, at the end of the desorption cycle, is saturated with aromatic desorbing agent would be ineffective to remove aromatics from a further quantity of charge, I have found that this is not the case but rather that a much sharper separation of the aromatic and non-aromatic portions of the charge is obtained than when a saturate hydrocarbon is employed as desorbing agent. Not only is the recovery of high purity aromatic product increased but also the purity of the saturate product is improved. Furthermore, the use of an aromatic in place of a saturate desorbing agent permits a considerable reduction in the total amount of desorbing agent required, which is distinctly advantageous in lowering operating costs of the process.

To secure the maximum benefits from the use of an aromatic hydrocarbon desorbent, it is important that the quantities of both charge and desorbing agent introduced into the silica gel during each cycle be within certain ranges. The quantity of charge fed to the silica gel during each cycle should be 50–85% of that amount defined hereinafter as the "equilibrium amount." The quantity of aromatic desorbent used during each cycle should lie within the range of 0.05–0.14 gal./lb. of silica gel and should be sufficient to cause the charge hydrocarbon content of the effluent stream from the silica gel to drop below 5% by volume during each cycle. The importance of these factors in securing an effective separation with efficient operating conditions can be seen from the description which follows.

When liquid charge is introduced into a bed of silica gel, the silica gel adsorbs both aromatic and non-aromatic hydrocarbons but in a proportion different from that in the liquid charge. Since the aromatics are preferentially adsorbed, the proportion of aromatics to non-aromatics is higher in the adsorbate than in the liquid phase. At any given aromatic concentration in the liquid phase, there is a definite equilibrium amount of aromatic in the adsorbed phase and this equilibrium amount increases with increasing aromatic content of the liquid phase. This is illustrated by Figs. 1 and 2 of the accompanying drawings, which show apparent adsorption equilibrium curves for several aromatic-saturate mixtures. These curves relate the volume per cent aromatic in the liquid phase to the gallon volume of aromatic apparently adsorbed per pound of silica gel at a given operating temperature. As a matter of convenience, the apparent adsorption, rather than true adsorption, is used generally in the adsorption art in determining adsorption isotherms; and such apparent adsorption is likewise used for the present purpose in determining equilibrium curves such as those shown in Figs. 1 and 2. It should therefore be understood that in the discussion which follows all reference to the amount of aromatic adsorbed is based upon the apparent adsorption.

Fig. 1 includes curves for mixtures of toluene and n-heptane at 75° F. and at 250° F. and for mixtures of benzene and n-heptane at 75° F. Fig. 2 shows equilibrium curves at temperatures of 78° F., 125° F. and 175° F. for mixtures of the aromatic portion and the saturate portion derived from a 300–400° F. straight run naphtha. As may be noted from the curves, the amount of aromatic in the adsorbate at equilibrium with a liquid phase of given aromatic content varies with temperature and also depends to a minor extent upon the particular aromatic and non-aromatic constituents of the mixture. It will also depend to an extent upon the particular silica gel adsorbent used.

The "equilibrium amount" as used herein can be calculated from equilibrium curves of the type shown in Figs. 1 and 2. It may be defined as the quantity of gasoline or kerosene to be treated which will contain that amount of aromatic required to saturate one pound of the silica gel, at the temperature at which the operation is to be conducted, with adsorbate having a composition in equilibrium with the charge composition. For example, assume that the mixture to be separated is a straight run naphtha having a boiling range of 300–400° F. and an aromatic content of 20% and that the operation is to be conducted at 125° F. From Fig. 2 it may be seen that the amount of aromatics which would be in the adsorbed phase at equilibrium at 125° F. with liquid phase containing 20% aromatics is about 0.0232 gallon per pound of silica gel. The amount of naphtha which would contain this amount of aromatics is 0.0232/0.20=0.116 gal. This value of 0.116 is thus the "equilibrium amount" of the specified naphtha charge. For practicing the present process at 125° F. the quantity of such charge fed to the silica gel during each cycle should be between 50% and 85% of this amount, or in other words should fall within the range of 0.058–0.099 gal. for each pound of silica gel used in the operation.

In treating charge fractions which boil in the upper part of the gasoline range or in the kerosene range, it is generally advantageous first to dilute the charge stock with a low boiling saturate hydrocarbon such as propane, butane, isopentane, n-pentane, cyclopentane or the like in order to reduce viscosity. When this is done, the approximate "equilibrium amount" can be calculated by considering the blend of charge stock and diluent as the charge and calculating from the reduced aromatic content of the blend. For example, assume that the charge stock is a 300–400° F. naphtha fraction containing 16% aromatics and that it is first blended with isopentane in the proportion of 4 volumes of naphtha to 1 volume of diluent. The resulting mixture would have an aromatic content of 12.8%. From Fig. 2 the amount of aromatics in the adsorbed phase in equilibrium with this charge composition at 78° F., for example, would be about 0.0214 gal./lb. of silica gel. The amount of the blend containing this amount of aromatics would be 0.0214/0.128=0.167 gal. The latter value is therefore the "equilibrium amount" for the blend; and the amount of blend that should be introduced to the silica gel during each cycle should be 50–85% of such value, or about 0.084–0.142 gal.

Figure 4:
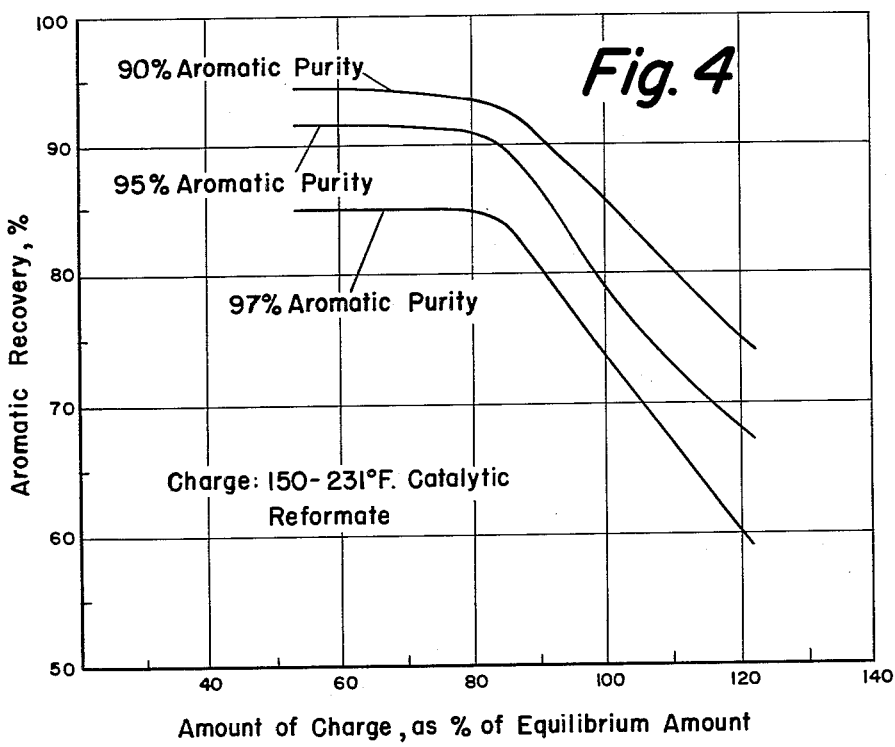

The importance of not exceeding about 85% of the "equilibrium amount" of charge introduced during each cycle is illustrated by the curves shown in Figs. 3 and 4. These curves show the relationship between the amount of charge introduced to the silica gel during each cycle, expressed in terms of the per cent of "equilibrium amount", and the per cent of total aromatics recovered in the form of products of certain specified purities. Fig. 3 is based upon a series of runs made under the conditions described hereinafter in Example V and is for a charge of a 300–400° F. straight run naphtha which had been diluted with isopentane. Fig. 4, which is based upon the series of runs described in Example VI is for a charge consisting of a 150–231° F. fraction obtained by catalytically reforming a straight run naphtha. Fig. 3 shows the aromatic recovery for aromatic product purities of 80%, 90% and 95%, while Fig. 4 shows the aromatic recovery for purities of 90%, 95% and 97%. Each of the curves drops rapidly as the amount of charge increases above about 85% of "equilibrium amount," which shows that the sharpness of separation was adversely affected by exceeding this amount.

It is important as a practical matter that the amount of charge introduced to the silica gel during each cycle be not less than 50% of "equilibrium amount," as the use of smaller amounts would result in uneconomic operation. A certain amount of desorbing agent per unit weight of silica gel is required in operating the process as more fully described below, so that a decrease in amount of charge per unit weight of silica gel means that more desorbent is required in proportion to the amount of charge treated. Reduction in the amount of charge to below 50% of "equilibrium amount" tends to render the process impractical. Furthermore, it is apt to cause lower recovery of high purity aromatic product by magnifying the effect of mixing that occurs at the interface between the portions of the effluent containing, respectively, the non-aromatic and aromatic charge hydrocarbons. In a silica gel bed of given diameter there will be a certain interfacial area between the aromatic and non-aromatic portions at which mixing will occur and thus tend adversely to affect the sharpness of separation. This interfacial mixing will become proportionately larger as the amount of charge per cycle is reduced and is apt to cause a drop in the recovery of high purity aromatics, particularly when a relatively shallow bed of silica gel is used to effect the separation. It is therefore important to maintain the amount of charge per cycle at least above 50% of "equilibrium amount" and preferably well above this value, for example, within the range of 60–80%.

It is likewise important in the desorption part of each cycle to use the aromatic desorbent in an amount within the range of 0.05–0.14 gal./lb. of silica gel. Furthermore, the amount should be sufficiently above the minimum specified to cause the gasoline or kerosene hydrocarbon content of the effluent stream to drop below 5% and preferably below 3%. The minimum amount required to effect such drop will depend upon several factors such as the particular charge stock being treated, the particular aromatic liquid used as desorbent, the temperature of operation and, to a slight extent, the depth of the silica gel bed employed. As a general rule, the minimum quantity will be larger when the charge stock or the aromatic desorbent is higher boiling. In most cases, however, an amount of the desorbent not greatly in excess of 0.05 gal./lb. of silica gel such as, for example, 0.08 gal./lb., will be entirely satisfactory for practicing the process. The amount should not exceed 0.14 gal./lb., since no further improvement in the separation would be achieved and the operation would be rendered uneconomic; and it is generally advantageous to operate well below this value in order to minimize the amount of desorbent used while still securing maximum effectiveness.

Figure 5:
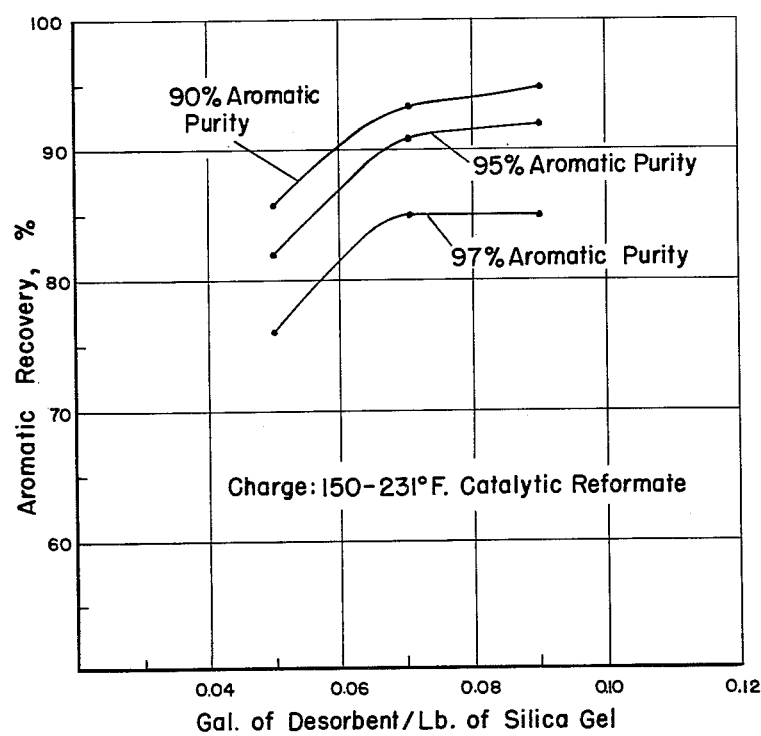

The effect of desorbent amount per cycle is illustrated by the curves in Fig. 5 which are based upon a series of runs made under the conditions described in Example VII. These curves show the per cent of the total aromatics recovered from a 150–231° F. catalytic reformate for aromatic product purities of 90%, 95% and 97%, utilizing mixed xylenes as the desorbing agent. In this case an amount of desorbent equal to 0.05 gal./lb. of silica gel was insufficient to effect high aromatic recovery, whereas increasing the amount of desorbent to only 0.07 gal./lb. raised the recovery to near the maximum. A further increase to 0.09 gal./lb. effected only a small additional increase in recovery for aromatic products of 90% and 95% purities and had no effect on recovery for 97% product purity. In the run where 0.05 gal./lb. was used, the charge hydrocarbon content of the effluent stream dropped to only 18.6%, whereas it dropped to 3.1% and 2.4%, respectively, in the runs where the desorbent amounts were 0.07 and 0.09 gal./lb.

The curves shown in Fig. 5 in general are typical of the effect of desorbent amount on the sharpness of separation of aromatics from the charge; but it is to be understood that variations in the charge stock or in operating conditions may result in some differences. The value of desorbent amount below which the curves drop sharply downwardly may vary from about 0.05 up to perhaps 0.08 or 0.09 gal./lb., dependent upon the particular stock being treated, the aromatic desorbent used, temperature, etc. In any case, however, if the amount of desorbent is sufficiently above 0.05 gal./lb. to cause the charge hydrocarbon content of the effluent stream to drop at least below 5% by volume, effective separation of the aromatic from non-aromatic charge components will be achieved. When sufficient desorbent has been used to reach a charge hydrocarbon content of 5% in the effluent, little additional desorbent is required to cause it to drop to a still lower value. It is therefore preferred in practicing the process to employ slightly more desorbent in order to reduce the content to less than 3%, so as to obtain substantially maximum separation and yet avoid the use of an excessive amount of desorbent.

The desorbing agent used in practicing the invention can be a single aromatic hydrocarbon or a mixture of aromatics such as a mixture of isomers or a mixture of homologues or both. In any case the desorbing agent should be composed essentially of aromatic material which is liquid under the conditions of operation and which boils below 500° F. and outside of the boiling range of the charge. Any such aromatic material may be used as the desorbing agent. The boiling point or boiling range of the desorbing agent may be either below or above that of the charge. In treating a charge fraction which boils higher than benzene, it usually will be advantageous to employ benzene as the desorbing agent due to the relative ease with which it may be removed from the product, although higher molecular weight aromatics which boil below or above the boiling range of the charge can be used in place of benzene, if desired. For example, in the treatment of a charge, containing $C_8$ aromatics, which has a boiling range of say 260–295° F., the desorbing agent can be benzene, toluene, or one or more $C_9$ or higher boiling aromatics. On the other hand, where the charge material is sufficiently low boiling to include benzene, the desorbing agent should be higher boiling than the charge. For instance, in treating a light naphtha fraction with a boiling range of say 100–200° F., toluene or any suitable higher molecular weight aromatic or mixture of such aromatics may be employed as the desorbing agent.

While as stated above the desorbing agent should be composed essentially of aromatic material, it is of course permissible that it contain some non-aromatic hydrocarbons as impurity. Commercial grades of aromatic hydrocarbons, wherein the concentration of aromatic constituents is of the order of say 95%, are satisfactory for use as the desorbing agent in the present process.

Figure 6:
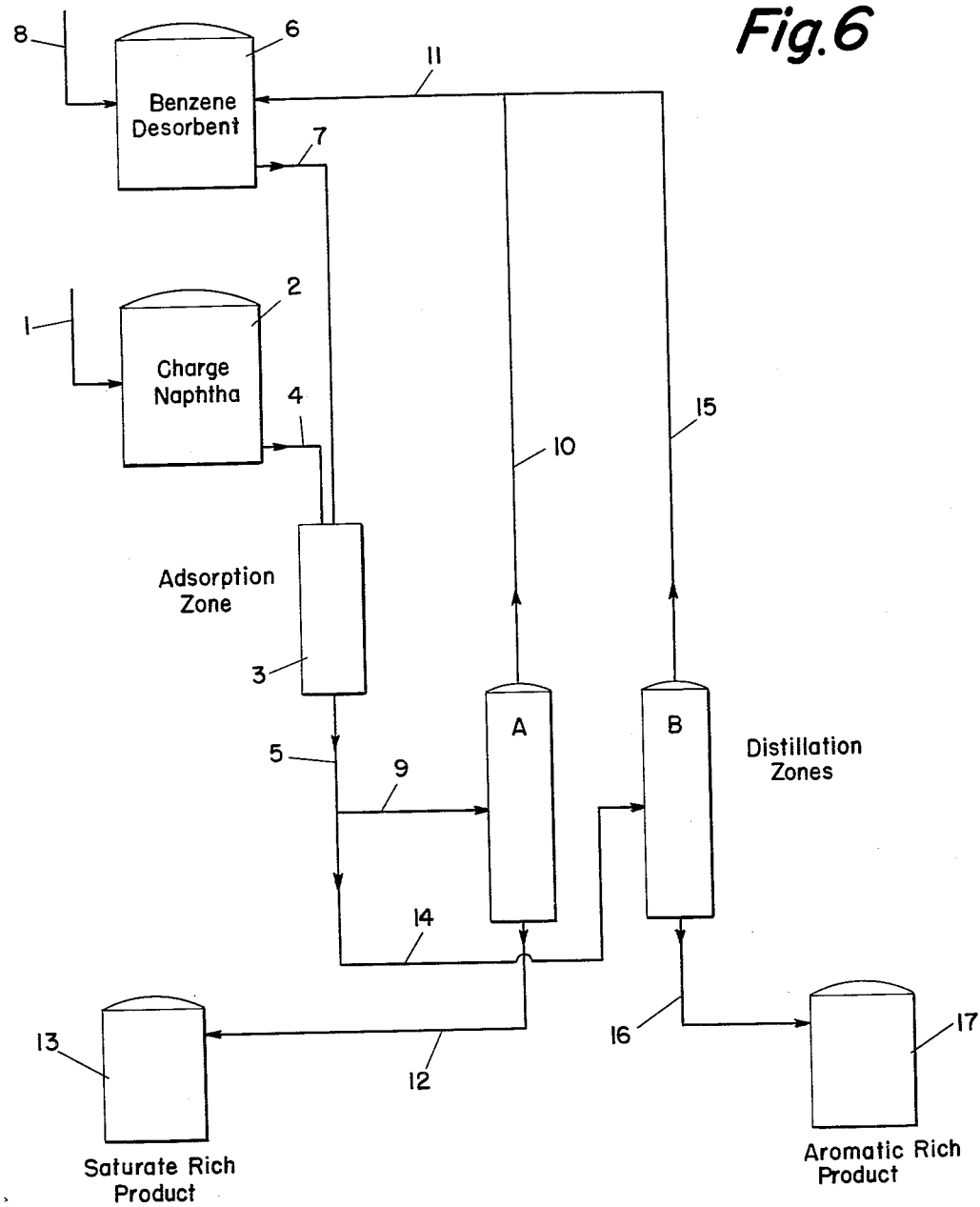
Figure 7:
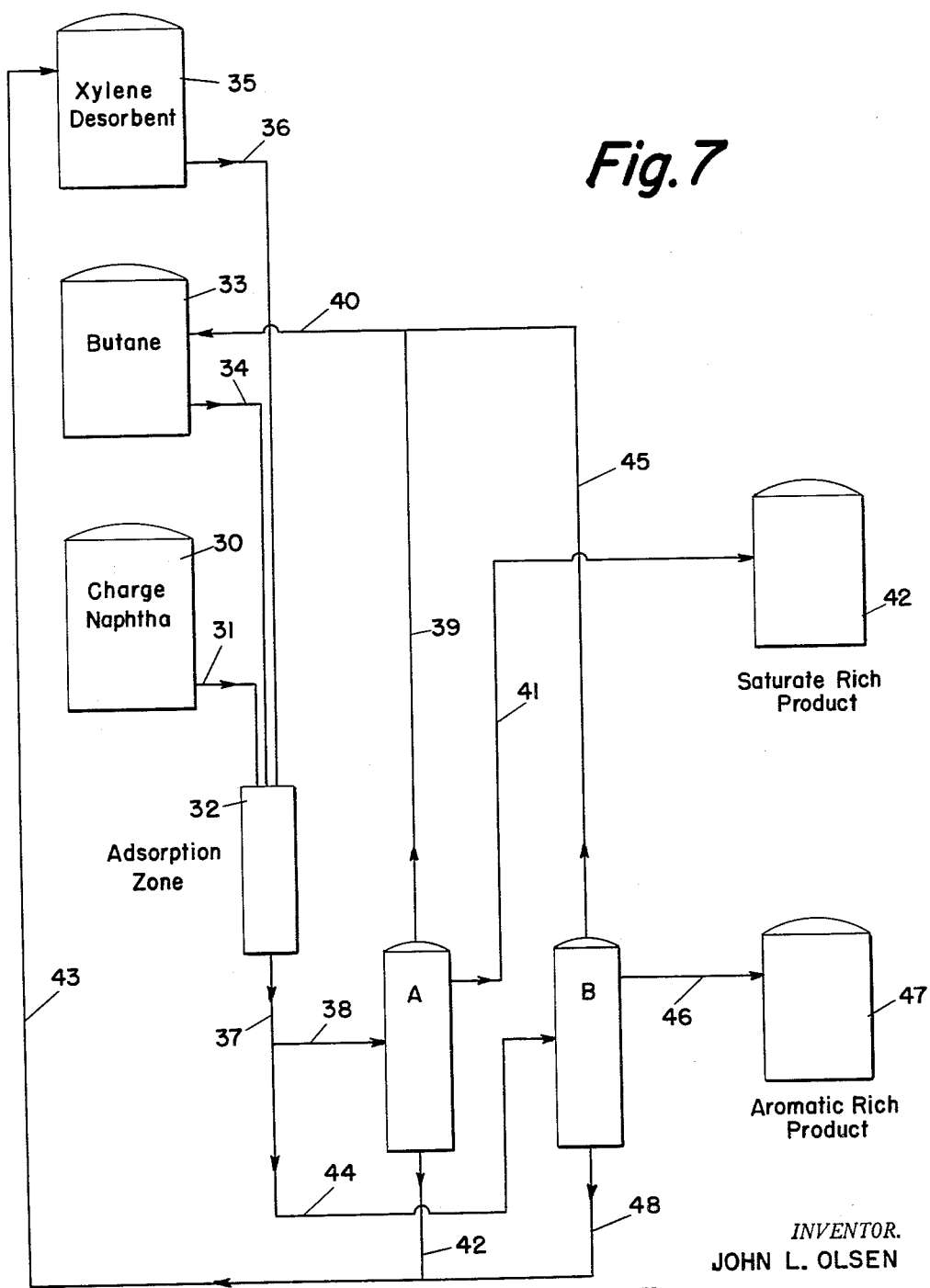

Fig. 6 is a diagrammatic flow-sheet illustrating one manner of practicing the process, while Fig. 7 diagrammatically illustrates another manner of operation. In the description of Fig. 6 which follows the charge material is considered to be a naphtha fraction which has an initial boiling point substantially above the boiling point of benzene and benzene is considered to be the desorbing agent; while in the description of Fig. 7 the charge is considered to be a lower boiling naphtha fraction having an end boiling point below the boiling range of xylenes and the desorbent is considered to be xylene. For purposes of simplicity, details such as condensers, pumps and valve arrangements have been omitted from the flow sheet but it will be understood that suitable provisions for these should be made.

Referring to Fig. 6, charge naphtha enters the system through line 1 and is introduced into tank 2 from which it is withdrawn as required for treatment in the process. A body of silica gel is maintained in an adsorption zone 3 which suitably may be in the form of a column packed with silica gel. While only one column is shown, it is to be understood that the adsorption zone may comprise a plurality of columns packed with silica gel and that these may be used alternately so as to permit the operation to be conducted in continuous manner. In each cycle of operation the charge naphtha is first introduced through line 4 into adsorption zone 3 in an amount of 50–85% of "equilibrium amount" to selectively adsorb the aromatic constituents on the silica gel.

As soon as the specified amount of charge naphtha has been introduced into the adsorption zone 3, flow of the same is discontinued and desorbing agent, which for purpose of illustration is considered to be benzene, is immediately passed into the adsorption zone from benzene recycle tank 6 by means of line 7. The benzene upon passing through the silica gel serves to displace the charge naphtha hydrocarbons present therein and thus effects reactivation of the silica gel for re-use in the next cycle of operation. The amount of benzene so introduced during each cycle is within the range of 0.05–0.14 gal./lb. of silica gel present in the adsorption column and is sufficient to cause the naphtha hydrocarbon content of the effluent which issues from the column through line 5 to drop below 5% during each cycle and preferably below 3%. Benzene may be added through line 8 as required to compensate for any losses which may occur in the operation.

After the required amount of benzene has been added to the adsorption zone, introduction of benzene is discontinued and charge naphtha is again immediately introduced through line 4 to start a new cycle of operation. As previously explained the presence of benzene on the adsorbent when the charge naphtha is introduced serves to cause a more efficient separation of the charge aromatics from the non-aromatic hydrocarbons by effectively decreasing the affinity of the silica gel for the non-aromatics without correspondingly decreasing its affinity for the aromatic components. The non-aromatic components readily pass through the benzene-wet gel while the aromatics are retained by the gel. As the charge aromatics are adsorbed by the silica gel, they in turn tend to displace the benzene therefrom and force it out of the adsorption zone.

The filtrate which leaves the adsorption column via line 5 will vary in composition throughout the cycle. During the first portion of the cycle it will be composed mainly of the saturate hydrocarbons from the charge naphtha in admixture with benzene. When the interface between the saturate and aromatic charge components reaches the bottom of column 3, the effluent composition will change rapidly and the effluent will then become composed mainly of charge aromatics in admixture with benzene. Near the end of the cycle the naphtha hydrocarbon content of the stream will drop to the desired value below 5%, so that the effluent will then be composed mainly of benzene. Corresponding to the beginning of the next cycle, the composition will then change again and the effluent will again become composed mainly of charge saturates and benzene. It should be noted that these changes in effluent composition do not occur at the same time that the inlet streams from tanks 2 and 6 are switched, since there is a time lag between the inlet and outlet ends of the column.

During the first portion of the cycle when the effluent is composed mainly of the saturate hydrocarbons and benzene, the effluent is sent through line 9 into distillation zone A and is therein distilled to remove the benzene as overhead product which is then returned to benzene recycle tank 6 by means of lines 10 and 11. The residue from distillation zone A, which constitutes the saturate-rich product of the process, is withdrawn through line 12 and sent to product tank 13. When the sharp change in effluent composition is reached, passage of the effluent to distillation zone A is discontinued and the effluent is then sent from line 5 through line 14 to distillation zone B wherein it is similarly distilled to remove benzene. The recovered benzene flows through lines 15 and 11 back to benzene tank 8 for re-use. The aromatic-rich product of the process passes from the bottom of distillation zone B through line 16 to storage tank 17. When the naphtha content of the effluent has dropped to the desired value below 5% and before a substantial amount of charge saturates again appears in the stream, flow is switched back to distillation zone A. This procedure of segregating the effluent stream into two portions, one of which contains most of the saturates and the other of which contains most of the aromatics from the charge, is continued throughout the operation. In order to provide for continuous operation of the distillation zones, surge tanks (not shown) may be included in lines 9 and 14 to provide suitable inventories of the two portions of effluent for continuous feeding to the distillation columns.

Fig. 7 illustrates a modification of the process in which a low boiling saturate hydrocarbon, such as propane, isobutane, n-butane, isopentane, n-pentane, cyclopentane or a mixture of such hydrocarbons, is introduced in liquid form in relatively small amount into the silica gel during each cycle immediately following the charge and prior to the introduction of aromatic desorbent. The purpose of adding this saturate liquid is to cause a still sharper separation by minimizing the effect of mixing at the interface between the portions of effluent which contain, respectively, the non-aromatic and aromatic charge components. For convenience this saturate hydrocarbon material is referred to herein as push liquid. When it is introduced into the silica gel bed immediately following the charge, it tends to pass through the charge aromatics therein but to push the charge saturates ahead of it. The push liquid therefore tends to concentrate at the interfacial zone between the two portions of effluent and thus reduce the charge hydrocarbon content at that point. Consequently the inevitable mixing that occurs at the interface has less adverse effect and a further improvement in the degree of separation is achieved.

A relatively small amount of the saturate push liquid will effect approximately the maximum improvement in separating efficiency and the use of still further amounts has little additional benefit. The amount that should be used will vary somewhat but generally is within the range of 0.01–0.03 gal./lb. of silica gel. The minimum amount within this range necessary to obtain approximately the maximum improvement will vary depending upon other factors that affect the degree of mixing at the interface, such as rate of throughput, viscosity of the charge components at the temperature of operation, and height of the column employed. A change of any factor which would reduce the tendency toward mixing at the interface will likewise reduce the amount of push liquid required for substantially maximum effectiveness.

For purpose of describing the process as illustrated in Fig. 7 the charge material is considered to be a naphtha fraction boiling below the boiling range of xylenes, the desorbing agent is considered to be xylene and the push liquid is considered to be butane. Charge naphtha is introduced from tank 30 at the beginning of each cycle through line 31 into adsorption column 32 in an amount equivalent to 50–85% of "equilibrium amount." Immediately following the introduction of charge, butane is withdrawn form tank 33 through line 34 and is introduced into column 32 in an amount generally of the order of 0.01–0.03 gal./lb. of silica gel. The xylene desorbent is then passed from tank 35 through line 36 into the adsorption column in an amount of 0.05–0.14 gal./lb. of silica gel, the amount being sufficient to cause the charge hydrocarbon content of the effluent from the silica gel to drop below 5% and preferably 3% during each cycle.

The effluent stream which passes from colume 32 via line 37 is segregated into two fractions in the same manner as described in connection with Fig. 6. The fraction which contains the saturate portion of the charge passes through line 38 to distillation zone A. Butane is distilled overhead through line 39 and thence passes back to tank 33 through line 40. A side stream fraction is removed from distillation zone A through line 41. This material constitutes the saturate-rich product of the process and is sent to tank 42. From the bottom of the distillation column xylene desorbent is recovered and passes through lines 42 and 43 back to tank 35 for re-use.

The other portion of the effluent stream, which contains the aromatic hydrocarbons from the charge, is sent from line 37 through line 44 to distillation zone B. Therein it is distilled to remove butane overhead through line 45 for return to tank 33, and a side stream fraction constituting the aromatic-rich product is obtained in line 46 through which it flows to tank 47. Xylene is withdrawn from the bottom of distillation zone B and passes through lines 48 and 43 back to tank 35 for re-use.

The following examples, in which percentages are given on a volume basis, are illustrative of the invention.

*Example I*

A straight run naphtha fraction having an approximate boiling range of 300–400° F. and an aromatic content of 16% was treated in a cyclic operation employing a commercial benzene (94% purity) as the desorbing agent. A column of about 4" I. D. and 33" height, packed with 11.4 lbs. of 28–200 mesh silica gel to a bulk density of 47 lbs./cu. ft., was used as the adsorption zone. With the specified charge and the particular batch of silica gel employed the "equilibrium amount" of charge was 0.149 gal./lb. In each cycle 4716 ml. of the charge naphtha was introduced into the column, this amount being equivalent to 73% of "equilibrium amount." Immediately following the introduction of charge 3430 ml. of benzene was introduced into the column as desorbent, the amount of desorbent thus being equivalent to 0.080 gal./lb. per cycle. The rate of percolation through the gel of both charge and desorbent was maintained throughout the operation at 0.15 gal./minute per sq. ft. The operation was conducted at about 75° F. After equilibrium operating conditions had become established, the effluent from the column during a cycle of operation was collected in a number of separate cuts as shown below in order to show the change in composition of the effluent throughout the cycle. Each of these cuts was separately distilled to remove the benzene and the resulting products, obtained as bottoms from the several distillations, were analyzed to determine aromatic and saturate contents. Results were as follows:

| Cut No. | Vol. of Cut, ml. | Benzene-free product | | | |
|---|---|---|---|---|---|
| | | Vol., ml. | Percent of Cut | Percent Aromatics | Percent Saturates |
| 1 | 298 | 4 | 1.5 | 2 | 98 |
| 2 | 298 | 10 | 3.2 | 2 | 98 |
| 3 | 298 | 55 | 18.4 | 0 | 100 |
| 4 | 298 | 128 | 43.0 | 0 | 100 |
| 5 | 893 | 562 | 63.0 | 0 | 100 |
| 6 | 894 | 742 | 83.0 | 0 | 100 |
| 7 | 895 | 730 | 81.6 | 0 | 100 |
| 8 | 895 | 739 | 82.6 | 0 | 100 |
| 9 | 895 | 711 | 79.5 | 8 | 92 |
| 10 | 348 | 243 | 70.0 | 41 | 59 |
| 11 | 348 | 212 | 61.0 | 66 | 34 |
| 12 | 448 | 235 | 52.5 | 84 | 16 |
| 13 | 446 | 169 | 37.9 | 94 | 6 |
| 14 | 446 | 91 | 20.5 | 96 | 4 |
| 15 | 446 | 7 | 1.5 | 88 | 12 |
| Total | 8,146 | | | | |

It is noteworthy that most of the saturate hydrocarbons of the charge naphtha appeared as substantially aromatic-free products. Calculations based on the data show that about 58% of the total aromatics in the charge can be obtained under the present operating conditions in a purity of 90%, while about 82% of the total aromatics can be obtained in a purity of 80%.

Example II

Another run was made with the same materials and under essentially the same conditions as in the preceding example except that in this case the charge naphtha was diluted with isopentane in a ratio of 4 parts of naphtha to 1 part isopentane in order to reduce the viscosity of the charge and improve the sharpness of operation. The "equilibrium amount" of this charge mixture was 0.167 gal./lb. In each cyclye a mixture composed of 4712 ml. of naphtha and 1180 ml. of isopentane was charged, following which 3420 ml. of benzene was introduced into the silica gel. The amount of charge mixture was thus equivalent to 80% of "equilibrium amount" and the amount of desorbent was 0.080 gal./lb. of silica gel per cycle. All other conditions were the same as specified in Example I. The following results were obtained:

| Cut No. | Vol. of Cut, ml. | Products | | | |
|---|---|---|---|---|---|
| | | Vol., ml. | Percent of Cut | Percent Aromatics | Percent Saturates |
| 1 | 449 | 4 | 1.0 | 0 | 100 |
| 2 | 298 | 3 | 1.1 | 0 | 100 |
| 3 | 299 | 6 | 1.9 | 0 | 100 |
| 4 | 298 | 48 | 16.2 | 0 | 100 |
| 5 | 298 | 104 | 34.8 | 0 | 100 |
| 6 | 892 | 447 | 50.1 | 0 | 100 |
| 7 | 890 | 538 | 60.5 | 0 | 100 |
| 8 | 893 | 571 | 64.0 | 0 | 100 |
| 9 | 893 | 580 | 65.0 | 0 | 100 |
| 10 | 892 | 592 | 66.4 | 0 | 100 |
| 11 | 890 | 605 | 68.0 | 1 | 99 |
| 12 | 288 | 195 | 67.6 | 12 | 88 |
| 13 | 347 | 222 | 64.0 | 35 | 65 |
| 14 | 347 | 210 | 60.6 | 86 | 14 |
| 15 | 446 | 245 | 55.0 | 96 | 4 |
| 16 | 446 | 155 | 34.7 | 96 | 4 |
| 17 | 446 | 65 | 14.6 | 96 | 4 |
| Total | 9,312 | | | | |

A comparison of these data with those of the preceding example show that a still sharper separation was obtained. Calculations show that 72% of the aromatics can be obtained in a purity of 95%, 88% in a purity of 90% and 95% in a purity of 80%.

Example III

The charge in this example was a mixture of 4 parts of a straight run naphtha having a boiling range of 205-305° F. and an aromatic content of 8% and one part of isopentane as diluent. The "equilibrium amount" for this mixture was 0.25 gal./lb. In each cycle 6918 ml. of the mixture, containing 5536 ml. of the naphtha and 1382 ml. of isopentane, was charged to the silica gel, followed by 3432 ml. of benzene as desorbent. This amount of charge mixture is equivalent to 64% of "equilibrium amount" and the amount of desorbent is equivalent to 0.08 gal./lb. of silica gel per cycle. A rate of percolation of 0.30 gal. per minute per sq. ft. was maintained; otherwise the conditions were the same as stated in Example I. The results were as follows:

| Cut No. | Vol. of Cut, ml. | Products | | | |
|---|---|---|---|---|---|
| | | Vol., ml. | Percent of Cut | Percent Aromatics | Percent Saturates |
| 1 | 298 | 0 | 0 | | |
| 2 | 298 | 0 | 0 | | |
| 3 | 298 | 35 | 11.7 | 8 | 92 |
| 4 | 298 | 70 | 23.3 | 5 | 95 |
| 5 | 895 | 334 | 37.3 | 1 | 99 |
| 6 | 895 | 488 | 54.5 | 2 | 98 |
| 7 | 1,790 | 1,120 | 62.4 | 2 | 98 |
| 8 | 1,792 | 1,224 | 68.0 | 1 | 99 |
| 9 | 696 | 465 | 66.8 | 0 | 100 |
| 10 | 605 | 411 | 67.8 | 0 | 100 |
| 11 | 348 | 215 | 61.7 | 12 | 88 |
| 12 | 348 | 153 | 44.0 | 62 | 38 |
| 13 | 448 | 289 | 64.5 | 95 | 5 |
| 14 | 447 | 85 | 19.0 | 97 | 3 |
| 15 | 447 | 19 | 4.2 | 96 | 4 |
| 16 | 447 | 21 | 4.7 | 92 | 8 |
| Total | 10,350 | | | | |

These results show that about 72% of the total naphtha aromatics can be obtained in a purity of 95%, about 83% in a purity of 90%, and 88% in a purity of 80%.

Example IV

This example illustrates the treatment of a charge containing not only aromatic and saturate constituents but also olefins. The starting material was a 205-302° F. fraction derived from a catalytic gasoline and having the following composition:

| | Per cent |
|---|---|
| Aromatics | 35 |
| Olefins | 6 |
| Saturates | 59 |

In each cycle of operation 2593 ml. of a mixture composed of 2073 ml. of the aforesaid catalytic gasoline fraction and 520 ml. of isopentane was introduced into the silica gel. The "equilibrium amount" for this mixture at the temperature of operation was 0.098 gal./lb. of silica gel. It should be noted that the approximate "equilibrium amount" of such a mixture containing olefins can be calculated from the equilibrium curve for a mixture of aromatics and saturates by considering the olefins as saturates for the purpose of the calculation. The amount of the blend thus charged per cycle was equivalent to 65% of "equilibrium amount." The conditions of operation otherwise were the same as stated in Example I. The results were as follows:

| Cut No. | Vol. of Cuts, ml. | Products | | | | |
|---|---|---|---|---|---|---|
| | | Vol., ml. | Percent of Cut | Percent Aromatics | Percent Olefins | Percent Saturates |
| 1 | 298 | 25 | 8.3 | 11 | 2 | 87 |
| 2 | 298 | 39 | 13.1 | 1 | 2 | 97 |
| 3 | 894 | 258 | 28.8 | 1 | 7 | 92 |
| 4 | 894 | 320 | 35.7 | 0 | 10 | 90 |
| 5 | 515 | 191 | 37.0 | 1 | 12 | 87 |
| 6 | 348 | 93 | 26.6 | 67 | 15 | 18 |
| 7 | 349 | 236 | 67.5 | 94 | 2 | 4 |
| 8 | 449 | 335 | 74.5 | 98 | 0 | 2 |
| 9 | 449 | 96 | 21.4 | 98 | 0 | 2 |
| 10 | 449 | 15 | 3.4 | 94 | 0 | 6 |
| 11 | 449 | 15 | 3.4 | 93 | 0 | 7 |
| 12 | 299 | 17 | 5.8 | 94 | 0 | 6 |
| 13 | 299 | 14 | 4.7 | 48 | 0 | 52 |
| Total | 5,990 | | | | | |

These results show that about 82% of the aromatics can be obtained under these operating conditions in a purity of 97%, about 95% in a purity of 95% and about 99% in a purity of 90%.

Example V

In this example a series of runs was made in which the amount of charge per cycle was varied over the range of about 50-113% of "equilibrium amount." The charge was a blend of 300-400° F. naphtha and pentane as described in Example II, and the conditions of operation were the same as specified in that example except for the variation in charge amount and the fact that the column was repacked with another batch of silica gel which apparently was somewhat more efficient than that employed in Example I. The results of these runs, expressed in terms of the per cent of the total aromatics which could be recovered as products of 80%, 90% and 95% purities for the various amounts of charge used, are shown as smoothed curves in Fig. 3 which has been described previously. These results illustrate that the amount of charge per cycle should not exceed about 85% of "equilibrium amount."

Example VI

In this example another series of runs was made to show the effect of varying the amount of charge introduced to the silica gel per cycle. The column used was 2½" I. D. and 13¼' high and was packed with 20.4 lbs. of 28-200 mesh silica gel to a density of 46.5 lbs/cu.

ft. The charge was a 150–231° F. catalytic reformate containing 27% aromatics and 2% olefins. The "equilibrium amount" for this charge at the temperature of operation was 0.0955 gal./lb. of silica gel; and in the runs the amount of charge used was varied within the range of about 52–123% of "equilibrium amount." The desorbent was a commercial mixture of xylenes known as 10° C. xylene and it was composed of 97% aromatics. The amount of such desorbent used per cycle was 0.09 gal./lb. of silica gel, which amount was sufficient in each run to cause the charge hydrocarbon content of the effluent from the column to drop well below 2% by the time the end of each cycle was reached. The temperature of operation was about 75° F. and the liquid percolation rate through the column was maintained at 0.22 gal./min./sq. ft. The results in terms of per cent of the total aromatics recovered as products having 97%, 95% and 90% purities are shown as smoothed curves in Fig. 4 as previously described. These results again show that the amount of charge should not exceed about 85% of "equilibrium amount."

Example VII

The series of runs of this example show the effect of varying the amount of desorbent used per cycle. The charge and desorbent were the same as specified in the preceding example and the same column of silica gel was used. The temperature and liquid throughput rates were also the same. In this instance, however, the amount of charge per cycle was held constant at about 52% of "equilibrium amount" and the amount of desorbent was varied from 0.05 to 0.09 gal./lb. of silica gel. The results are shown in the form of curves in Fig. 5 as previously discussed. The charge hydrocarbon contents of the effluent stream at the end of each cycle corresponding to the several amounts of desorbent used were as follows:

| Amount of Desorbent, gal./lb. | Charge Hydrocarbon Content, Percent |
|---|---|
| 0.05 | 18.6 |
| 0.07 | 3.1 |
| 0.09 | 2.4 |

The results as shown in Fig. 5, indicate that for the present charge stock and desorbent under the conditions here employed, at least 0.07 gal. of desorbent per lb. of silica gel should be used to approach maximum aromatic recovery.

Example VIII

In the present example a small amount of isopentane was used as push liquid to obtain maximum sharpness in separating the aromatics. A column of 4" I. D. and 9' height, packed with 39.2 lbs. of 28–200 mesh silica gel to a density of 49.3 lbs. per cu. ft., was used. The charge was a 150–240° F. catalytic reformate containing about 45.8% aromatics. The "equilibrium amount" for this charge at the temperature of operation was 0.056 gal./lb. of silica gel. The desorbent was a commercial mixture of xylenes known as 2° C. xylene and having an aromatic content of 98%. In each cycle of operation the amount of reformate charged to the silica gel was 0.033 gal./lb., which coresponds to 59% of "equilibrium amount." The charge was followed immediately by 0.03 gal. of isopentane per lb. of silica gel as push liquid. After the addition of isopentane the xylene desorbent was added in amount of 0.086 gal./lb. The temperature of operation was maintained at 130° F. and the liquid percolation rate through the column was 1.40 gal./minute/sq. ft. The per cent of total aromatics covered under the foregoing conditions as products of the purities specified below are as follows:

| Aromatic Purity, Percent | Aromatic Recovery, Percent |
|---|---|
| 98 | 89 |
| 95 | 93.5 |
| 90 | 98 |

These results show that good recovery of product of high purity can be obtained.

Numerous modifications of the process are permissible within the scope of the invention. For example, a fraction of the efflux stream may be taken intermediate of the two main portions of the stream which contain, respectively, the saturate and aromatic charge components in order to keep the material adjacent the interface out of the products. This generally will not be necessary, however, as the conditions specified for operating the process will effect as efficient a separation as normally is desired.

This application is a continuation-in-part of my copending application Serial Number 49,451, filed September 15, 1948, and now abandoned.

Having described my invention, what I claim and desire to protect by Letters Patent is:

1. A cyclic process for separating aromatic hydrocarbon from a hydrocarbon charge boiling in the range of gasoline and kerosene and composed of non-aromatic and aromatic hydrocarbons which comprises introducing into a bed of silica gel during each cycle an amount of liquid charge equivalent to 50–85% of "equilibrium amount" to selectively adsorb charge aromatic, displacing the adsorbed aromatic by introducing into the silica gel during each cycle an essentially aromatic hydrocarbon liquid desorbent which boils below 500° F. and outside of the charge boiling range in amount of 0.05–0.14 gal./lb. of silica gel, said amount of aromatic desorbent being sufficient to cause the charge hydrocarbon content of the effluent stream from the silica gel during each cycle to decrease below 5% by volume, segregating the effluent during each cycle into two portions one of which contains most of the saturate components of the charge in admixture with desorbent and the other of which contains most of the aromatic components of the charge in admixture with desorbent and in an aromatic purity of at least 80° on a desorbent-free basis, separately distilling each of said portions to recover desorbent from the charge hydrocarbons, and directly re-using the wet silica gel for treatment of a further quantity of charge in the next cycle.

2. Process according to claim 1 wherein a relatively low boiling saturate hydrocarbon liquid is introduced during each cycle into the silica gel immediately after the introduction of charge in amount to reduce mixing between said portions of effluent during passage through the silica gel.

3. Process according to claim 1 wherein the amount of said aromatic desorbent is sufficient to cause the charge hydrocarbon content of the effluent stream to decrease below 3% by volume.

4. Process according to claim 2 wherein the amount of said saturate hydrocarbon liquid introduced is about 0.01–0.03 gal./lb. of silica gel.

5. A cyclic process for separating aromatic hydrocarbon from a hydrocarbon charge boiling in the range of gasoline and kerosene and composed of non-aromatic and aromatic hydrocarbons which comprises introducing into a bed of silica gel during each cycle an amount of liquid charge equivalent to 50–85% of "equilibrium amount" to selectively adsorb charge aromatic, introducing into the silica gel during each cycle an essentially aromatic hydrocarbon liquid desorbent which boils below 500° F. and outside of the charge boiling range in amount of 0.05–0.14 gal./lb. of silica gel, withdrawing from the silica gel an effluent stream the charge hydrocarbon content of which is mainly saturate hydrocarbon during the first part of the cycle, thereafter rapidly increases in aromatic hydrocarbon content and subsequently decreases below 5% by volume of said stream in the latter part of the cycle, segregating the effluent stream into at least two portions one of which constitutes effluent before said rapid increase in aromatic content and which comprises most of the saturate components of the charge in admixture with desorbent and another of which constitutes effluent comprising most of the aromatic components of the charge in admixture with desorbent and in an aromatic purity of at least 80% on a desorbent-free basis, separately distilling said portions to remove desorbent and to obtain the charge hydrocarbons as products which are, respectively, saturate-rich and aromatic-rich, and directly re-using the desorbent-wet silica gel for treatment of a further quantity of charge in the next cycle.

6. Process according to claim 5 wherein the amount of said aromatic desorbent is sufficient to cause the charge hydrocarbon content of the effluent stream to decrease below 3% by volume.

7. Process according to claim 5 wherein the hydrocarbon charge boils above the boiling point of benzene and the desorbent is benzene.

8. Process according to claim 5 wherein the hydrocarbon charge boils below the boiling range of xylene and the desorbent is xylene.

9. A cyclic process for separating aromatic hydrocarbon from a hydrocarbon charge boiling in the range of gasoline and kerosene and composed of non-aromatic and aromatic hydrocarbons which comprises introducing into a bed of silica gel during each cycle an amount of liquid charge equivalent to 50–85% of "equilibrium amount" to selectively adsorb charge aromatic, introducing into the silica gel during each cycle immediately after the introduction of said charge a relatively low boiling saturate hydrocarbon liquid in amount of about 0.01–0.03 gal./lb. of silica gel, then introducing into the silica gel during each cycle an essentially aromatic hydrocarbon liquid desorbent which boils below 500° F. and outside of the charge boiling range in amount of 0.05–0.14 gal./lb. of silica gel, withdrawing from the silica gel an effluent stream the charge hydrocarbon content of which is mainly saturate hydrocarbon during the first part of the cycle, thereafter rapidly increases in aromatic hydrocarbon content and subsequently decreases below 5% by volume of said stream in the latter part of the cycle, segregating the effluent stream into at least two portions one of which constitutes effluent before said rapid increase in aromatic content and which comprises most of the saturate components of the charge in admixture with desorbent and said relatively low boiling saturate hydrocarbon liquid and another of which constitutes effluent comprising most of the aromatic components of the charge in admixture with desorbent and in an aromatic purity of at least 80% on a desorbent-free basis, separately distilling said portions to remove desorbent and said saturate hydrocarbon liquid and to obtain the charge hydrocarbons as products which are, respectively, saturate-rich and aromatic-rich, and directly re-using the desorbent-wet silica gel for treatment of a further quantity of charge in the next cycle.

10. Process according to claim 9 wherein the amount of said aromatic desorbent is sufficient to cause the charge hydrocarbon content of the effluent stream to decrease below 3% by volume.

References Cited in the file of this patent

UNITED STATES PATENTS

| | | |
|---|---|---|
| 2,398,101 | Lipkin | Apr. 9, 1946 |
| 2,441,572 | Hirschler et al. | May 18, 1948 |
| 2,518,236 | Hirschler | Aug. 8, 1950 |
| 2,554,908 | Hirschler | May 29, 1951 |
| 2,576,525 | Lipkin | Nov. 27, 1951 |

OTHER REFERENCES

Ind. Eng. Chem., vol. 42, pages 1287–1293 (1950). Article by Eagle et al.